Figure 1:
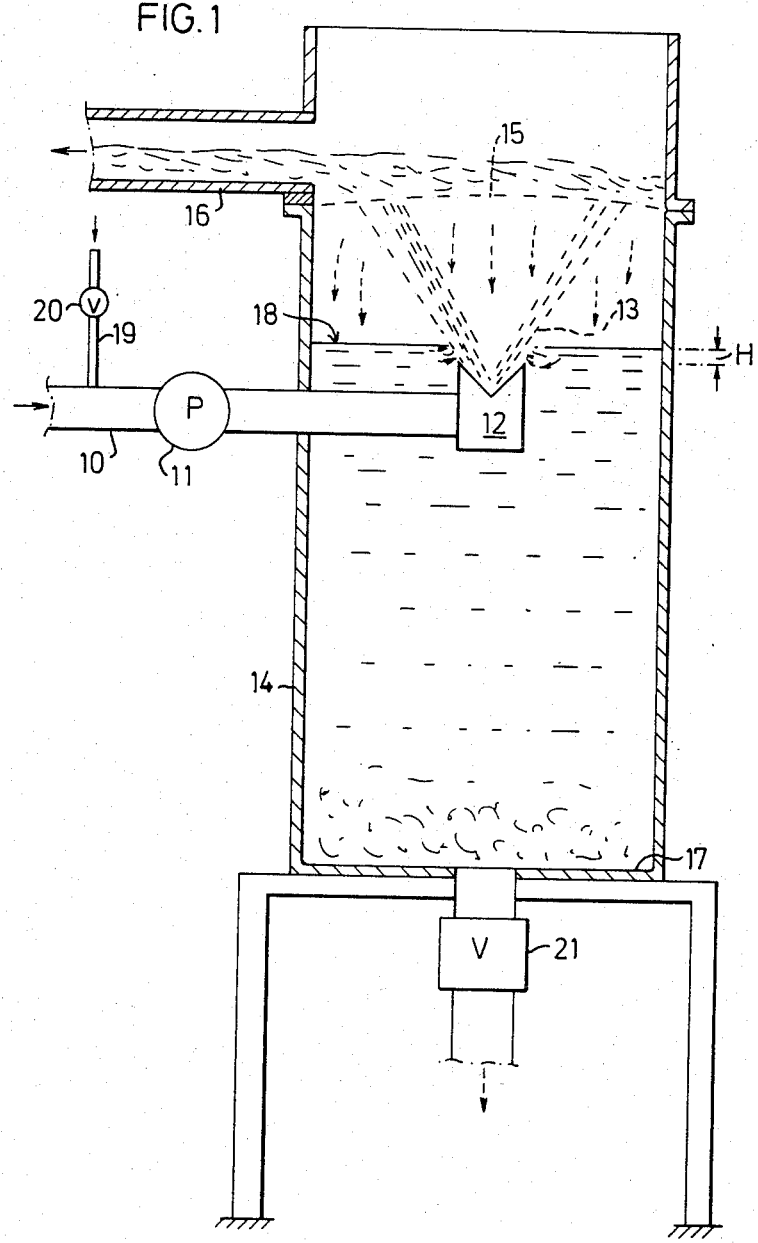

United States Patent [19]

Janson

[11] Patent Number: 4,536,295
[45] Date of Patent: Aug. 20, 1985

[54] METHOD FOR SEPARATING COARSE PARTICLES FROM A LIQUID

[75] Inventor: Bengt G. Janson, Djursholm, Sweden

[73] Assignee: AB Spray Technics S.T., Tranas, Sweden

[21] Appl. No.: 541,736

[22] Filed: Oct. 13, 1983

[30] Foreign Application Priority Data

Oct. 20, 1982 [SE] Sweden .................................. 8205961

[51] Int. Cl.³ .............................................. B07B 1/04
[52] U.S. Cl. .................................... 210/804; 210/115; 210/220; 209/250; 209/273; 162/55
[58] Field of Search ............... 209/250, 268, 273, 352, 209/359; 210/115, 435, 533, 803, 804, 220; 162/55, 213

[56] References Cited

U.S. PATENT DOCUMENTS

| | | | |
|---|---|---|---|
| 518,238 | 4/1894 | Fullner | 210/533 X |
| 1,512,323 | 10/1924 | Wallace | 209/250 |
| 3,789,978 | 2/1974 | Janson | 209/250 X |
| 4,153,543 | 5/1979 | Janson | 209/273 X |
| 4,290,979 | 9/1981 | Sugiura | 210/221.2 X |

Primary Examiner—Richard V. Fisher
Assistant Examiner—W. Gary Jones
Attorney, Agent, or Firm—Young & Thompson

[57] ABSTRACT

For the purpose of separating coarse particles from a liquid such as water, e.g. in the cellulose industry, laundries etc., a vertical container is used in which a nozzle receives liquid from a pump and sprays the liquid in the form of a conical liquid jet up against the underside of a screening cloth. Above this cloth there is an outlet for the liquid, coarse particles impinging against the cloth and falling back to the bottom of the container. In accordance with the invention the total flow from the pump and jet is led off via the screening cloth and outlet above said cloth, the liquid level in the container being disposed between the nozzle and the screening cloth so that the liquid jet is sprayed through a layer of the liquid in the container before reaching the screening cloth.

3 Claims, 2 Drawing Figures

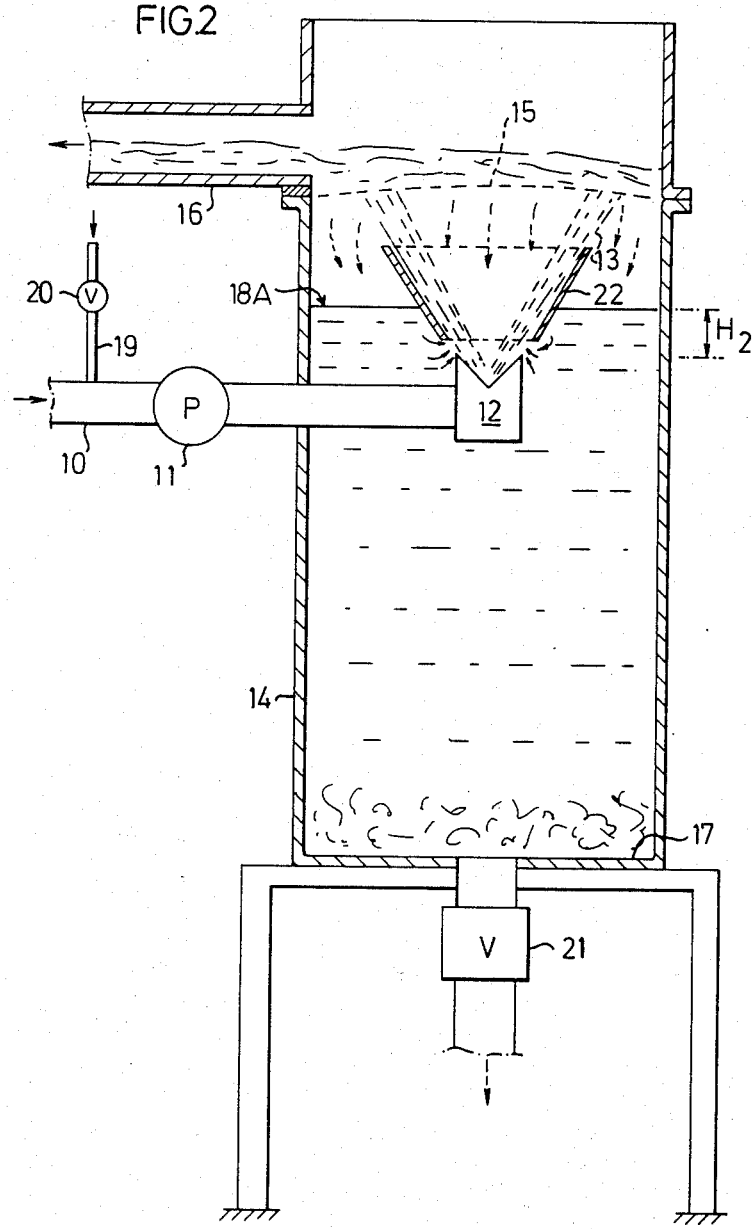

METHOD FOR SEPARATING COARSE PARTICLES FROM A LIQUID

The present invention relates to a method for separating coarse particles from a liquid.

Examples of apparatus for performing such methods are discussed in the U.S. Pat. Nos. 3,789,978 and 4,153,543.

In the known apparatus, a liquid such as water is sprayed from a nozzle arranged in a vertical container, and in the form of a liquid cone up towards the underside of a horizontal screening cloth. The liquid contains coarse and fine particles. With respect to the cellulose industry, these particles contain, inter alia, coarse and finer fibres. In laundry plant the liquid may come from washing machines and may then contain fine fibres, lint and the like as well as coarser contaminants.

The known apparatus is operated such that the liquid level in the container is kept at a constant level below the nozzle, such that the latter is situated openly in the closed air space between the screening cloth and liquid level in the container. In the known containers, the liquid level is kept constant with the aid of an overflow, and this liquid must be cleaned from accompanying coarse particles before the liquid can be reused. In the cellulose industry this tapping off means that extra energy is required for treating this liquid, the volume of which can attain 15-30% of the total supply from the pump. This division of the total flow thus results in considerable disadvantages.

In laundry plant there is also the added disadvantage that tapping-off via the overflow results in not inconsiderable heat losses as well.

The object of the present invention is therefore to eliminate the disadvantages in the known apparatus as far as possible, and this is achieved in accordance with the invention by operating the apparatus in the manner disclosed in the characterizing portion of the following main claim.

In the method in accordance with the invention, the liquid is thus permitted to leave the container solely via the screening cloth. The flow through the screening cloth per time unit will thus be equal to the total flow per time unit from the pump, which entirely eliminates the disadvantages with the divided flow to the overflow in the known apparatus. In the method and apparatus in accordance with the invention, the coarse particles will slowly sink down to the bottom of the container for collection in amounts which can be emptied at intervals from the container, in a simple and rapid manner, by quite simply opening a bottom tapping valve for a short while. Considerable advantages are achieved with regard to laundries, since no hot water is tapped off, all the water passing through the screening cloth and being able to give off its heat via heat exchangers. In practical use in laundries, the apparatus in accordance with the invention has been found to carry special advantages, amongst others that the BOD and COD contents in the water passing through the screening cloth can be reduced by at least 60%. This advantage is achieved particularly when the constant liquid level is arranged at a higher level than the nozzle. Since these contaminating contents result in extra penalty fees in certain countries, a reduction thereof results in correspondingly lower fees, in turn resulting in lower operating costs.

In order finely to adjust the liquid level to one above the nozzle, the liquid pipe may be provided, in accordance with the invention, with an air pipe and associated central valve, which are fitted to the liquid pipe before the pump, so that more or less air can be sucked into the liquid. This added air is then released in the air space under the screening cloth and affects the air pressure in this space, which in turn affects the liquid level in the container. The liquid supplied normally contains a small amount of air, which is also released during spraying to provide an excess pressure in the air space under the screening cloth.

So as to further improve the operating conditions, a baffle cone is suitably provided above the nozzle, and spaced from it, so that the preferably hollow, conical liquid jet passes through a liquid layer in the gap between the downwardly pointing apex of the cone and the nozzle. The configuration of the jet is thus maintained by the cone up to the top end of the latter and continues from there to meet the screening cloth. The liquid level in the container thus comes a distance up on the outside of the baffle cone. Practical trials have shown that this cone results, inter alia, in more stable operation with a stable level of the liquid.

Some embodiments of apparatus for practicing a method in accordance with the invention are illustrated as examples on the accompanying drawings.

FIG. 1 is a schematic section through an apparatus in accordance with the invention, FIG. 2 illustrates the same apparatus as FIG. 1 with the difference that a baffle cone is arranged above the nozzle.

Liquid containing coarse and finer particles such as fibres of different sizes is supplied via a pipe 10. The liquid usually contains a certain amount of air as well. A pump 11 is coupled into the pipe 10, the pressure of the pump being conventionally regulatable. Liquid is pumped with the aid of the pump to a nozzle 12, of known embodiment and providing a conical liquid jet 13, which should suitably be hollow.

The nozzle 12 is disposed in a vertical container 14 having in its upper part a partition wall in the form of a screening cloth 15. The mesh size of the screening cloth can be in the range 10–100$\mu$, and is usually in the lower region of this range.

There is an outlet 16 above the screening cloth for the liquid which passes through it together with fine particles.

In accordance with the invention all the liquid supplied from the pump departs through the screening cloth 15 and this outlet 16.

The liquid is sprayed up towards the underside of the screening cloth, coarser particles impinging against the cloth and falling back into the container, where they sink and collect on its bottom 17.

The liquid in the container is kept at a substantially constant level 18, this level being a distance H above the nozzle outlet orifice in FIG. 1, such that the conical liquid jet must pass through a liquid layer of corresponding thickness without losing its conical shape. The liquid in the vicinity of the nozzle will thus be entrained in the liquid jet, resulting in that a larger amount of liquid is sprayed up towards the screening cloth than that which is supplied by the pump. For example, if the pump supplies 100 liters per minute, 120 liters per minute may be sprayed against the screening cloth, 100 liters per minute departing through the screening cloth and outlet 16, while 20 liters per minute falls back down from the cloth and is returned to the jet coming from the nozzle, for being sprayed up against the cloth once again. The greater liquid quantity against the screening cloth appears to contribute to more stable and quieter running conditions.

In the apparatus according to FIG. 1, a rough setting of the liquid level is made by regulating the pump pressure. Fine adjustment of this setting is then made by supplying more, or less, extra air to the suction side of the pump 11. For this purpose an air pipe 19 is connected to the liquid pipe 10 before the pump so that air can be sucked in through this pipe 19, this air being finely regulated to the desired amount with the aid of an adjustable valve 20. In principle, it is also possible to provide a regulatable amount of air directly in the air space between the cloth 15 and liquid level 18, but this requires a compressed air supply, which is somewhat more complicated than quite simply allowing air to be sucked in through the pipe 19.

As is illustrated in the embodiment according to FIG. 2, the apparatus is here provided with a truncated cone 22, the conical angle of which is approximately the same as that of the jet coming from the nozzle 12. The cone is positioned coaxial with, and above the nozzle, with the truncated end downwards such that the conical liquid jet passes into the cone and is thus protected inside it until the jet passes the upper end of the cone and meets the screening cloth 15.

Between the lower end of the cone and the nozzle there is a gap, the height of which defines the liquid layer through which the conical liquid jet must force its way, simultaneously as it entrains liquid (including coarse particles) from the liquid layer in the vicinity of the jet.

The upper end of the cone is approximately halfway between nozzle and cloth, or somewhat higher. The liquid level 18A in the container is here higher than in FIG. 1, since it is situated at a greater height than the gap between the nozzle and cone. The liquid level in this case is at a height H2 above the nozzle orifice.

As the liquid level is higher in this case, the result is improved "ejector action", i.e. the entrainment by the jet of surrounding liquid in the gap. As with the apparatus illustrated in FIG. 1, there is thus achieved that a larger quantity of liquid impinges on the screening cloth than that which is pumped through the pump. Practical trials have shown that the truncated cone results in a considerable improvement by further stabilizing operating conditions.

At the bottom of the container there is a tap 21 for intermittently tapping off the coarse particles which have collected on the bottom of the container. In certain cases it is sufficient to tap off these coarse particles once per 24 hours.

From the above it will be seen that one of the most important advantages of the method in accordance with the invention, in relation to the apparatus illustrated in the aforementioned U.S. patents, is that the total flow from the pump is not continuously branched off into more than one flow from the container. As already mentioned, the amount branched off can be as much as about 15–30% of the total flow in the known apparatus. In water purification, for example, this means that branched-off water must also be purified to obtain a total purification effect. This is not necessary with the apparatus in accordance with the invention, since 100% of the total flow passes through the screening cloth and further out through the outlet after it. For a given flow through the screening cloth, the method in accordance with the invention thus requires a pump with lower pump capacity for a given processed flow than the pump capacity required with the known apparatus.

I claim:

1. A method of separating coarse particles from a liquid by the liquid being pumped to a nozzle disposed in a vertical container, said nozzle spraying the liquid upwards in the form of a liquid cone against the underside of a horizontal screening means, such that the coarse particles fall back down into the container, while finer particles pass through the screening means together with the liquid and are taken off as a fine fraction, a liquid level in the container being caused to maintain a substantially constant level, characterized in that the whole of the liquid quantity supplied through the nozzle per time unit during continuous operation is led off through the screening means, and in that during continuous operation the liquid level in the container is caused to remain at a substantially constant height above an outlet orifice of the nozzle but below said screening means, such that a conical liquid jet is sprayed through a layer of the liquid in the container before reaching said screening means, the liquid in the vicinity of the nozzle being entrained in the liquid jet so that a larger amount of liquid is sprayed up toward the screening cloth than is supplied through the nozzle.

2. Method as claimed in claim 1, characterized in that the liquid level in the container is finely adjusted by mixing air into the liquid before the screening means.

3. Method of claim 1 wherein the coarse particles are coarse fibres.

* * * * *